US007591439B2

(12) United States Patent
Tang

(10) Patent No.: US 7,591,439 B2
(45) Date of Patent: Sep. 22, 2009

(54) ELECTRIC CONDIMENT GRINDER WITH EPICYCLIC GEARTRAIN

(75) Inventor: Yu Wing Tang, Kowloon (HK)

(73) Assignee: Samson Bright Industrial Company Limited, Kowloon (HK)

( * ) Notice: Subject to any disclaimer, the term of this patent is extended or adjusted under 35 U.S.C. 154(b) by 119 days.

(21) Appl. No.: 11/849,562

(22) Filed: Sep. 4, 2007

(65) Prior Publication Data

US 2009/0057452 A1 Mar. 5, 2009

(51) Int. Cl.
*A47J 42/06* (2006.01)

(52) U.S. Cl. .................................................. 241/169.1

(58) Field of Classification Search ............. 241/169.1, 241/169

See application file for complete search history.

(56) References Cited

U.S. PATENT DOCUMENTS 4,685,625 A * 8/1987 Mazza ......................... 241/36
6,056,217 A * 5/2000 Friden ........................ 241/135
6,340,061 B2 * 1/2002 Marshall et al. ............... 172/41

* cited by examiner

*Primary Examiner*—Mark Rosenbaum
(74) *Attorney, Agent, or Firm*—Robert D. Katz; Cooper & Dunham LLP

(57) ABSTRACT

A grinder for condiments such as pepper has a grinding rotor mounted to rotate relative to a grinding stator for grinding the condiment therebetween. An speed-reducing epicyclic geartrain is connected for transmitting torque between a motor and the rotor. The geartrain includes a plurality of spur gear epicyclic gearsets, each gearset comprising planet gears meshed with a sun gear, the planet gears of each gearset supported upon a planet carrier, the gearsets stacked within a common ring gear with the sun gears coaxial, adjacent sun gears and planet carriers of adjacent gearsets being rotationally fast for transmitting torque between the adjacent gearsets. The adjacent sun gears and planet carriers of adjacent gearsets are integrally formed a melt processable polymer. The gearsets are held between an end wall and a closure at axially opposing ends of the ring gear to form a gearbox, the end wall being formed integrally with the ring gear and the closure being fixed to the ring gear.

2 Claims, 3 Drawing Sheets

ELECTRIC CONDIMENT GRINDER WITH EPICYCLIC GEARTRAIN

TECHNICAL FIELD

The present invention relates to grinders for condiments such as pepper or salt, and particularly to grinders driven by electric motors through an epicyclic geartrain.

BACKGROUND OF THE INVENTION

Hand-held cordless electric grinders provide a convenient and fast method for dispensing freshly ground peppers or the like. A conventional grinder of this type has a battery compartment at the top of the housing, with an electric motor connected via a speed reduction geartrain to a drive shaft. The geartrain includes heavy metal gears with high tooth loadings. The shaft extends through a condiment reservoir to a grinding mechanism at the base of the housing.

Whereas the art is replete with various designs of condiment grinders, it will be understood that there is nevertheless a continuing need for and interest in improvements to electric condiment grinders of this type. In particular there is a need for designs that are able to be manufactured more cost-effectively. The grinder should have a geartrain with a low weight and inertia and which can be readily installed. It should also be compact with coaxial drive and driven shafts, relatively efficient and quiet in operation, while being able to operate at high motor speeds. It is an object of the present invention to address the above needs or more generally to provide an improved condiment grinder.

DISCLOSURE OF THE INVENTION

According to one aspect of the present invention there is provided a condiment grinder comprising:

a motor having a motor shaft that rotates about a central axis;

a grinding rotor mounted to rotate about the central axis relative to a grinding stator, the rotor and stator cooperating for grinding the condiment therebetween, and a plurality of spur gear epicyclic gearsets connected for transmitting torque from the motor shaft to the grinding rotor, each gearset comprising planet gears meshed with a sun gear, the planet gears of each gearset supported upon a planet carrier, the gearsets stacked within a common ring gear with the sun gears coaxial, adjacent sun gears and planet carriers of adjacent gearsets being rotationally fast for transmitting torque between the adjacent gearsets.

Preferably the gearsets are formed from a melt processable polymer, the adjacent sun gears and planet carriers of adjacent gearsets being integrally formed, the planet carriers having a disc portion with first and second opposing parallel faces extending perpendicular to the central axis, a plurality of axle portions protruding from the first face for supporting planet gears, the sun gear protruding from the second face.

Preferably the gearsets are held between an end wail and a closure at axially opposing ends of the ring gear to form a gearbox, the end wall being formed integrally with the ring gear and the closure being fixed to the ring gear.

Preferably the grinder further comprises a housing having a battery-receiving compartment in an upper portion thereof, a condiment reservoir in a lower portion of the housing adjacent the grinding rotor and stator, an intermediate compartment between the condiment reservoir and battery compartment, a pair of coupling parts receiving the motor and gearbox, the coupling parts being joined to form a module in which the motor and gearbox are in drivingly connected, at least one of the coupling parts having a jaw slidably mounted thereto for movement between an extended position in which the jaw extends from an outer surface of the at least one coupling part to be received in a recess in the housing for holding the module in position within the intermediate compartment; and a retracted position in which the jaw is retracted within the outer surface.

Both of the coupling parts are preferably hollow, said at least one of the coupling parts including two jaws mounted to slide between respective retracted and extended positions, the jaws being received to slide radially within respective laterally-extending openings on diametrically opposite sides of said at least one of the coupling parts.

This invention provides a grinder which is effective and efficient in operational use, and which may be economically constructed. It has a geartrain with a low weight and inertia, which is compact with coaxial drive and driven shafts, is relatively efficient and quiet in operation, and is able to operate at high motor speeds. It also simplifies assembly and maintenance by offering an essentially modular design.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
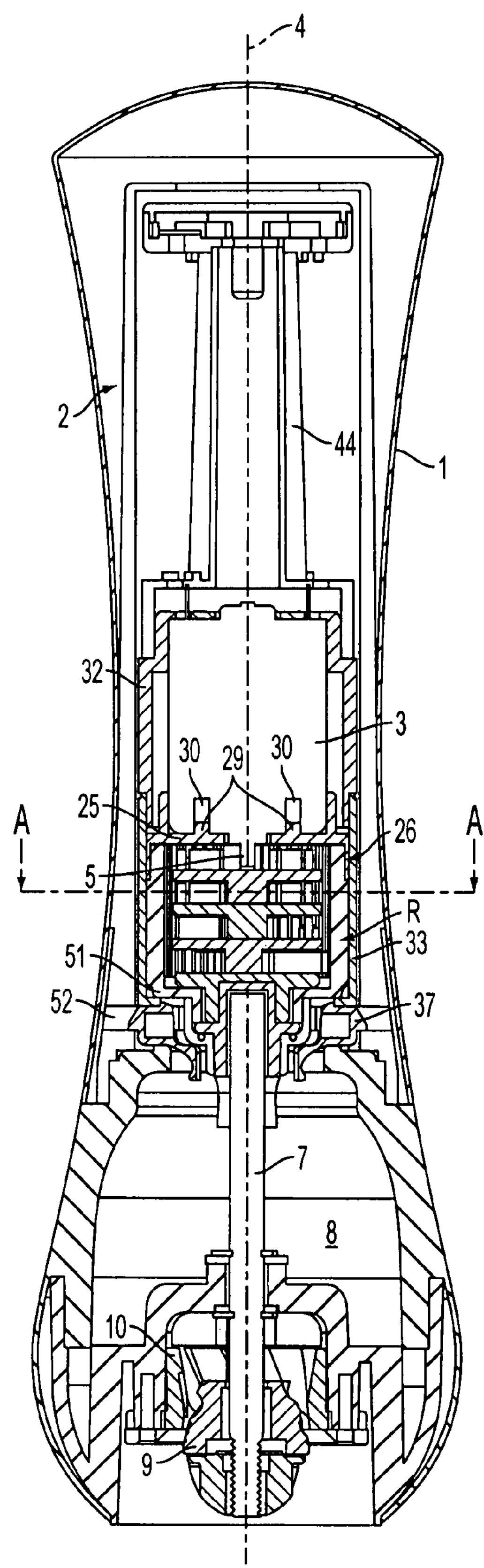
FIG. 1 is a central longitudinal cross section a preferred embodiment of the grinder of the invention.
Figure 2:
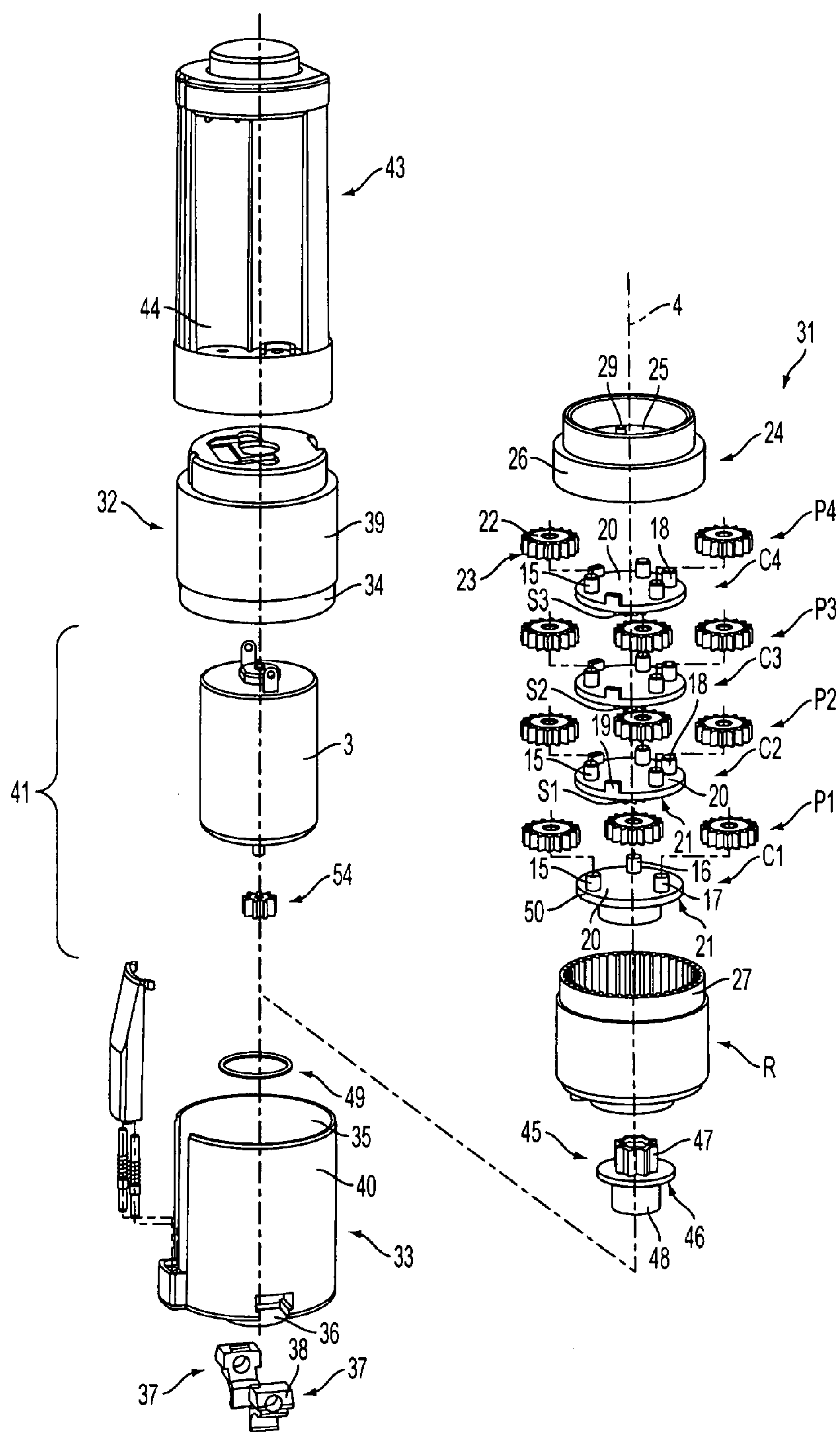
FIG. 2 is an exploded view of the geartrain and motor assembly of the grinder of FIG. 1
Figure 3:
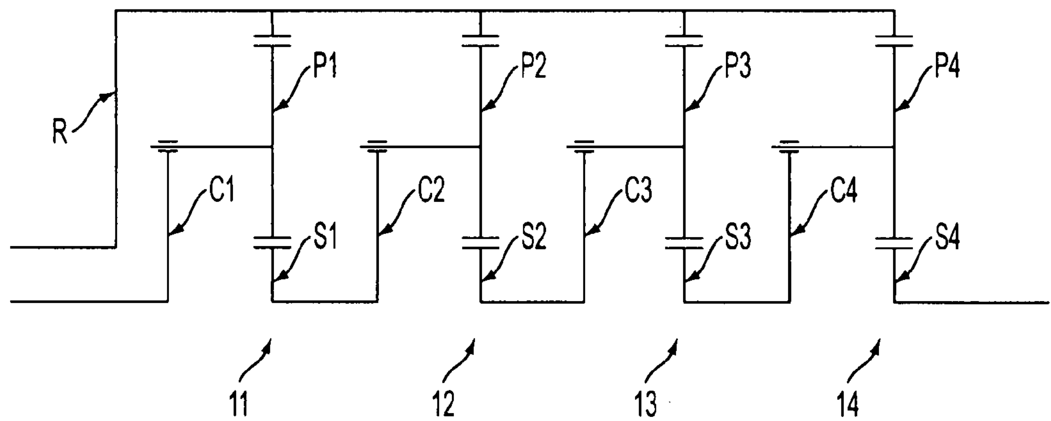
FIG. 3 is schematic of the geartrain of the grinder of FIG. 1.
Figure 4:
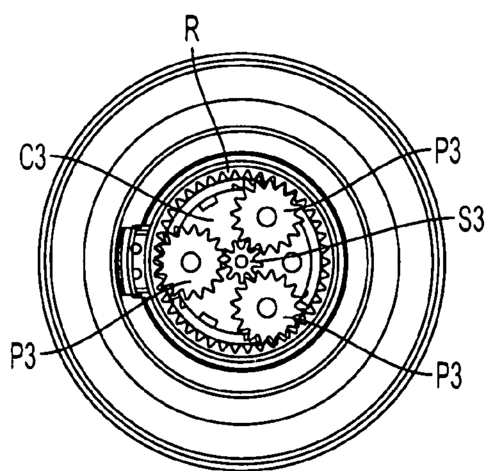
FIG. 4 is a transverse cross section along line AA of FIG. 1.

Referring to the drawings, a hand-held cordless electric grinder includes a housing 1 having a generally circular cross section of a waisted form, having broader dimensions near its base and top. A battery compartment 2 is provided at the top of the housing above an electric motor 3 having a shaft 5 rotating about the central axis 4. The motor shaft 5 is connected through an epicyclic geartrain to the inner end of elongate drive shaft 7 extending through a condiment-receiving reservoir 8. The motor 3 and epicyclic geartrain are received in the waisted portion of the housing within an intermediate compartment between the battery compartment 2 and condiment reservoir 8. The outer end of the shaft is rotationally fast with grinding rotor 9 which cooperates with a grinding stator 10 for grinding the condiment therebetween.

The epicyclic geartrain module or gearbox 31 includes four spur gear epicyclic gearsets 11-14 mounted coaxially. The elements of the gearsets are moulded from a melt processable polymer. Each of the gearsets 11-14 comprises planet gears P1 P2, P3, P4 meshed with a respective sun gear S1, S2, S3, S4 and supported upon a planet carrier C1, C2, C3, C4. The planet carriers C2, C3, C4 are of common construction, each integrally formed and rotationally fast with a respective one of the sun gears S1, S2, S3. The gearsets 11-14 are stacked within a common ring gear R, with which all the planet gears P1, P2, P3, P4 mesh.

The carrier C1 includes three parallel, equally angularly spaced shafts 15-17 for supporting the three planet gears P1. The carriers C2, C3, C4 also include like shafts 15-17, and further include a shaft 18 diametrically opposite shaft 15, together with two tabs 19 positioned to balance the mass of the shaft 18. The carriers C1, C2, C3, C4 include a disc portion 50 with a radially-extending face 20 from which the shafts 15-17 protrude, and an opposing parallel face 21. The planet gears P1, P2, P3, P4 also include parallel opposing radially-extending surfaces 22, 23.

Formed integrally with the ring gear R at Its outer end is an end wall 51 forming a shoulder abutting the outer face 21 of the carrier C1 for locating the carrier C1 axially. The gearsets 11-14 are stacked axially within the ring gear R, the three planet gears P1, P2, P3 being mounted on the shafts 15, 16, 17 and located axially without the need for fasteners, or the like, being received between faces 20 and 21 of the adjacent carriers.

A closure 24 includes an annular flange 26 which is received in a complementary recess 27 formed in the outer wall of the ring gear R. An interference fit between the flange 26 and recess 27 prevents movement of the closure 24 relative to the ring gear R. The closure 24 includes an end wall 25 retaining the gearsets 11-14 within the ring gear R. The two planet gears P4 are mounted on the shafts 15 and 18 and axially located between the face 20 of the carrier C4 and the end wall 25. Formed on the upper side of the end wall 25 are protrusions 29 received in respective recesses 30 in the motor 3 to prevent rotation between the ring gear R and motor 3.

The epicyclic gearbox 31 and electric motor 3 are assembled as a drive module 41 within upper and lower hollow coupling parts 32, 33, receiving the motor 3 and gearbox 31 respectively. The coupling parts 32, 33 have axially aligned cylindrical walls 39, 40 and are coupled by engagement of the annular rim 34 of the upper coupling part 32 received in the mouth 35 of the lower coupling part 33, the coupling parts 32, 33 then being permanently joined as by adhesive, welding or the like. Received to slide radially within respective laterally-extending openings 36 on diametrically opposite sides of the lower coupling part 33 are two jaws 37, each having a head 38. The jaws 37 are extended such that each head 38 projects from the surface 40 and is received in a recess 52, thereby locating the drive module 41 within the housing 1.

A battery holder 43 is supported on the upper coupling part 32. The battery holder 43 includes circumferentially spaced cavities 44, each receiving a generally cylindrical battery cell (not shown).

A coupler 45 transmits torque from the carrier C1 to the shaft 7. The shaft 7 has a square cross section and the lower end 48 of the coupler has a complementary opening. The upper end 47 includes axially elongated ribs and is received in a recess (not shown) of complementary shape in the carrier C1. The coupler further includes an annular face 46. A seal 49 is received in a groove in the lower coupling part 33 extending about the coupler 45, with the seal 49 engaging the annular face 46.

Aspects of the present invention have been described by way of example only and it should be appreciated that modifications and additions may be made thereto without departing from the scope thereof.

The invention claimed is:

1. A condiment grinder comprising:

a motor having a motor shaft that rotates about a central axis;

a grinding rotor mounted to rotate about the central axis relative to a grinding stator, the rotor and stator cooperating for grinding the condiment therebetween;

a plurality of sour gear epicyclic gearsets connected for transmitting torque from the motor shaft to the grinding rotor, each gearset comprising planet gears meshed with a sun gear, the planet gears of each gearset support upon a planet carrier, the gearsets stacked within a common ring gear with the sun gears coaxial, adjacent sun gears and planet carriers of adjacent gearsets being rotationally fast for transmitting torque between the adjacent gearsets; and a housing having a battery receiving compartment in an upper portion thereof, a condiment reservoir in a lower portion of the housing adjacent the grinding rotor and stator, an intermediate compartment between the condiment reservoir and battery compartment, a pair of coupling parts receiving the motor and gearbox, the coupling parts being joined to form a module in which the motor and gearbox are in drivingly connected, at least one of the coupling parts having a jaw slidably mounted thereto for movement between an extended position in which the jaw extends from an outer surface of the at least one coupling part to be received in a recess in the housing for holding the module in position within the Intermediate compartment; and a retracted position in which the jaw is retracted within the outer surface wherein the gearsets are formed from a melt processable polymer, the adjacent sun gears and planet carriers of adjacent gearsets being integral, the planet carriers having a disc portion with first and second opposing parallel faces extending perpendicularly to the central axis, a plurality of axle portions protruding from the first face for supporting planet gears, with the sun gear protruding from the second face; and wherein the gearsets are held between an end wall and a closure at axially opposing ends of the ring gear to form a gearbox, the end wall being formed integrally with the ring gear and the closure being fixed to the ring gear.

2. The grinder of claim 1 wherein both of the coupling parts are hollow, the at least one of the coupling parts including two jaws mounted to slide between respective retracted and extended positions, the jaws being received to slide radially within respective laterally-extending openings on diametrically opposite sides of the at least one of the coupling parts.

* * * * *